3,317,496
COPOLYMERS OF DIOLEFINS AND OLEFINS AND METHOD OF PRODUCING THEM
Giulio Natta, Piero Pino, and Lido Porri, Milan, Italy, assignors to Montecatini Edison S.p.A., Milan, Italy
No Drawing. Continuation of application Ser. No. 570,961, Mar. 12, 1956. This application June 25, 1963, Ser. No. 290,362
Claims priority, application Italy, Mar. 18, 1955, 4,006/55
3 Claims. (Cl. 260—88.2)

This invention relates to copolymers of alpha-olefins and diolefins and to methods for making the copolymers.

This application is a continuation of Ser. No. 570,961 filed on Mar. 12, 1956, and now abandoned.

The object of the invention is to provide new, linear, non-isotactic copolymers of diolefins at least one of the double bonds of which is a vinyl double bond and alpha-olefins of the formula $$CH_2=CHR$$

in which R is an aliphatic, alicyclic, or aralkyl radical containing 1 to 18 carbon atoms. In a specific embodiment, R is an alkyl or cycloalkyl radical.

Alpha-olefins of the general formula given can be polymerized with the aid of polymerization agents obtained by treating a heavy metal of the sub-group of Groups IV to VI of the Periodic Table (Mendeleeff), such as the halides, with a metallo-organic compound derived from one of the elements forming the 2nd and 3rd columns of said Periodic Table, the resulting homopolymers being predominantly iso-tactic (crystalline) or predominantly non-isotactic (amorphous).

It is found, in accordance with the present invention, that when mixtures of the alpha-olefins with diolefins are subjected to polymerizing conditions in the presence of the said polymerization agents, substantially linear, amorphous (non-crystallizable) copolymers are obtained. In general, the new copolymers produced are more highly amorphous than either homopolymers of the alpha-olefins, or homopolymers of the diolefins, produced with the aid of the same polymerization agents.

It is also found, in accordance with the present invention, that certain of the polymerization agents, e.g., the agent obtained by reacting titanium tetrachloride with triethyl aluminum, which result in the production of homopolymers of the alpha-olefins comprising a remarkably high proportion of crystalline product, result, when used with the alpha-olefin-diolefin mixture, in copolymers which are almost completely amorphous. This occurs to a remarkable extent when the alpha-olefin present in the mixture contains more than three carbon atoms. The number of polymerization agents prepared as described, which are selective for the production of amorphous copolymers is greater than is the case for the homopolymers so that when it is desired to produce the amorphous copolymers a wider choice of the polymerization agent to be used is possible.

The present invention has the advantage that it makes possible the production of high molecular weight copolymers containing a large number of double bonds starting from diolefins and alpha-olefins such as propylene, alpha-butene, etc. Such diolefin-alpha-olefin mixtures, when polymerized by previously known cationic or free radical processes, yield only low molecular weight copolymers which are mostly highly branched and, in any case, unsuitable for the production of high-grade elastomers.

The present copolymers are different from the known copolymers of isobutylene and diolefins, which belong to a different class. In fact, isobutylene, which is an olefin of the $CH_2=CR_2$ type, contains the vinylidene double bond, $CH_2=CHR$, when substances containing it are polymerized in the presence of catalysts which influence the polymerization through a cationic mechanism.

Isobutylene also behaves very differently from the alpha-olefins $CH_2=CHR$ when it is attempted to utilize the present polymerization agents as aids in the polymerization thereof. Either the isobutylene does not polymerize at all or it polymerizes very slowly. In any case, it does not polymerize to high molecular weight polymers.

A surprising advantage of copolymerizing the alpha-olefin, diolefin mixtures with the aid of the polymerization agents prepared from the heavy metal compound and the metallo-organic compound is that the copolymerization can be carried out at a temperature between room temperature and 100° C., to produce products in which the diolefin has polymerized to substantially linear products containing double bonds in the main chain.

The present method differs fundamentally from the known copolymerization processes involving a cationic mechanism, for example, those involving the use of catalysts of the Friedel-Crafts type. In fact, the last-mentioned processes yield, at room temperature or higher, cyclic or highly branched polymers in which the number of residual double bonds is much lower than would be expected if every structural unit of the copolymer, corresponding to one molecule of copolymerized diolefin, were to contain a double bond.

These known processes for polymerizing diolefins which involve a free-radical mechanism, are not effective to produce any appreciable yield of copolymers of the alpha-olefins of the vinyl type with diolefins.

The alpha-olefins of formula $CH_2=CHR$ as defined herein and which may be copolymerized with the diolefin include propylene, butene-1, pentene-1, and hexene-1.

Diolefins which may be copolymerized with the alpha-olefin $CH_2=CHR$ in accordance with the invention are the conjugated and non-conjugated diolefins at least one of the double bonds of which is a vinyl double bond.

This includes butadiene (1–3), the various pentadienes, isoprenes, and two cis and trans isomers of pentadiene-(1, 3) and other conjugated diolefins having a higher number of carbon atoms and containing at least one vinyl double bond.

It is observed that when an aliphatic conjugated diolefin $CH_2=CH—CH—CHR$ containing a vinyl double bond is copolymerized with the alpha-olefin $CH_2=CHR$, the copolymerization involves only the positions 1, 2 and 1, 4. In the particular case in which a diolefin of the formula $CH_2=CR—CH=CH_2$, R being other than hydrogen, is used, the copolymerization does not involve, at least to any appreciable extent, the position 1, 2 but only the positions 1, 4 and 3, 4.

In the case of conjugated diolefins of the type of butadiene, 1, 2 and 1, 4 polymerization takes place simultaneously and, therefore, some of the double bonds are found in the main chain of the copolymer.

On the other hand, when non-conjugated diolefins, such as, for example, pentadiene-(1, 4), hexadiene-(1, 5) and so on are used, and the copolymerization is carried out under conditions to prevent isomerization of the diolefin, the copolymer does not contain double bonds in the main chain, except possible end double bonds. In those copolymers, the double bonds are contained practically exclusively in the side chains.

In general, the ratio of the alpha-olefin to diolefin in the starting monomers mixture is between 1:1 and 10:1 by weight.

The mixture copolymerized may contain more than one alpha-olefin $CH_2=CHR$, and more than one diolefin. The unsaturated vinyl hydrocarbon mixtures contained in the fractions from the cracking of crude oil or natural gases which comprise hydrocarbons of from 2 to 5 carbon atoms may be copolymerized by the present method. The presence of paraffins, even in high concentration, does not hinder the copolymerization of the alpha-olefins and diolefins which takes place with high yields of the copolymer. When the $C_4$ fraction only of the cracking is used as starting material, a butadiene-butene-1 copolymer is produced.

In practice, in order to obtain copolymers having the characteristics described herein and useful as high-grade elastomers, it may be, and usually is, necessary or desirable to operate under controlled, selected conditions, which may involve the conditions under which the polymerization agent is prepared.

Thus, if the polymerization agent is prepared by reacting a halide of a heavy metal of the subgroup of the 4th to 6th groups of the Mendeleeff Periodic Table, in which the metal has the maximum valency corresponding to its position in the table, with a metallo-alkyl compound, the polymerization agent is more active, when used for the production of homopolymers of the alpha-olefins, if it is prepared in the presence of the alpha-olefin to be polymerized. However, those halides of the heavy metals in which the metal has the maximum valency have the property of polymerizing the diolefins very rapidly even before the addition of the metallo-alkyl compound, through a cationic mechanism, yielding low polymers. Therefore, if the alpha-olefin-diolefin mixture remains in contact with the halide of the metal in which the metal has its maximum valency, before all of the halide has reacted with the metallo-alkyl compound, low polymers of the diolefin produced in consequence can contaminate the product of the subsequent alpha-olefin-diolefin copolymerization.

In order to avoid this difficulty, the polymerization agent to be used for the copolymerization may be prepared in the absence of the diolefin and preferably in the presence of only a small amount, if any, of the alpha-olefin. The alpha-olefin-diolefin mixture to be copolymerized may then be introduced as soon as the preparation of the polymerization agent has been completed.

Another effective method for avoiding the difficulty consists in replacing the halide of the metal in which the metal has the maximum valency corresponding to its position in the Periodic Table with a different compound of the metal which does not behave at all, or only to a reduced extent, as a Friedel-Crafts catalyst. For example, in the case of titanium-containing catalysts, it is convenient, for the present purposes, to replace a portion (1 or 2) of the halogen atoms in the titanium tetrahalide with alkoxyl groups containing, e.g., 2 to 6 carbon atoms. An example of such a compound of the heavy metal which is useful is titanium dichloro-dibutylate.

Another factor to be considered in the practice of the present invention is that certain of the diolefins are more highly reactive (have a higher rate of acceptance into the copolymers molecule) than the alpha-olefins. This more pronounced reactivity can cause undesired changes in the composition of the copolymer during the copolymerization, even when the starting mixture is very rich in diolefins, which changes result in variations in the composition of the copolymers produced as the copolymerization proceeds. Such variations in the copolymer composition can be reduced or eliminated by regulating or adjusting the relative concentrations of the monomers during the copolymerization or by using a continuous copolymerization system in which a monomeric composition of predetermined alpha-olefin-diolefin ratio is fed continuously into the reactor.

The copolymerization conditions employed may vary, depending on the particular diolefin and polymerization agent used. In general, it is possible to operate at temperatures below 120° C. preferably between 0° C. and 80° C. It is also possible to operate with solutions of the monomers which are liquid under normal pressure or under pressures of a few atmospheres, it may be more convenient to effect the copolymerization in the absence of solvents.

The polymerization aid is obtained, as has been indicated hereinabove, by reacting the heavy metal halide or alkoxyl-substituted halide with the metallo-organic compound.

The heavy metal compound is a halide or alkoxyl-substituted halide of a compound or a mixture of compounds of a heavy metal of the subgroup of Groups IV to VI of the Mendeleeff Periodic Table, including thorium and uranium, i.e., compounds of the elements of titanium, zirconium, hafnium, thorium, vanadium, tantalum, niobium, chromium, molybdenum, tungsten and uranium.

The metallo-organic compound comprises a substance or mixutre of substances consisting of simple and complex compounds the molecules of which contain one of the elements forming the 2nd and 3rd columns of the Mendeleeff Periodic Table, i.e., beryllium, magnesium, zinc, cadmium and other elements of the second group, and aluminum and other elements of the third group.

The valencies of the aforesaid metal element are linked to the same or different alkyl radicals, which may contain 1 to 18 carbon atoms, such as ethyl, propyl, butyl, etc. In case of trivalent metals one valence may be satisfied by halogen, or by an alkoxy radical containing from 2 to 4 carbon atoms.

The polymerization agent may be prepared by separately dissolving or suspending the heavy metal compound and metallo-organic compound in a suitable inert solvent of the same class in the cold (0° C. to 20° C.) and then bringing the suspensions or solutions together at room temperature. The resulting composition containing the polymerization agent in suspension, with or without further dilution with the inert solvent may be added to the reactor preferably fitted with a stirring device in which the polymerization is conducted. If the polymerization agent is prepared in the absence of monomers, or at least in the absence of of the diolefins, halides of the heavy metals, such as chlorides may be used. However, the polymerization agent may be prepared in the reactor, in the presence of the monomers. In that case, it is preferred, as already mentioned herein, to use a heavy metal halide partially substituted by alkoxyl groups in order to avoid premature polymerization of the diolefin, or to prepare the polymerization agent in the presence of the alpha-olefin only, and then introduce the diolefin.

Solvents suitable for use in preparing the polymerization agent and for carrying out the copolymerization are paraffinic hydrocarbons such as, for instance, a light gasoline substantially free of olefinic bonds, n-heptane, iso-octane and other liquids preferably of the non-aromatic type. However, benzene may also be used.

The molar proportions of the metallo-organic compound to heavy metal compound are preferably such that the metallo-organic compound is not more than ten times the heavy metal compound. Molar ratios of 1:1 to 10:1, preferably 3:1 to 5:1 are satisfactory.

The autoclave should be previously thoroughly dried and evacuated because it is of general advantage to carry out the entire process in the absence of oxygen and water.

The purification of the polymerization product can be carried out by venting the unreacted gases, coagulating the polymerizate with methanol acidified with hydrochloric acid, filtering the product and washing it with methanol. Liquid polymers (low molecular weight products) may be removed on the filter and the residual solid then fractionated (if it is heterogeneous). In purifying the products, care is taken to avoid oxidation when the copolymers contain very reactive double bonds.

In general, the copolymers may contain, by weight in the polymer molecule, from 2 to 90% of the diolefin.

The properties of the copolymers can be modified somewhat by varying the composition of the monomer mixture used.

Copolymers are obtained by the present method which can be vulcanized by conventional methods used for vulcanizing natural or synthetic rubbers. The vulcanized copolymers have the properties of elastomers the characteristics of which depend on the molecular weight, the number and type of the double bonds present in the copolymer, and the degree of copolymerization. It is possible to obtain readily, by the practice of this invention, copolymers which show completely reversible elastic elongations of several hundred percent of the initial length and the mechanical properties of which are considerably influenced by compounding with carbon black or other finely dispersed filler or pigment, in the same way as are the properties of conventional rubbers.

The fraction of the copolymer obtained as described in Example 1 below which was soluble in heptane and insoluble in ether was vulcanized using a mix of the following composition:

| | Parts |
|---|---|
| Copolymer | 100 |
| ZnO | 5 |
| S | 2 |
| Benzothiazole disulfide | 2 | and with a curing time of 60 minutes at 150+5° C. An elastomer was obtained which, for an elastic elongation of 200%, showed practically no permanent deformation.

The following examples are given to illustrate certain presently preferred specific embodiments of the invention, it being understood that these examples are not intended as limitative.

Example 1

9 g. of triethyl aluminum dissolved in 400 cc. n-heptane, and 310 g. of butene-1, butene-2 mixture containing 55% of butene-1, are introduced into a shaking autoclave of 2 liters capacity from which the air has been carefully removed. The autoclave is put in agitation and heated. As soon as the temperature has reached about 50° C., 8.5 g. of $TiCl_2(OC_4H_9)_2$ dissolved in 50 cc. of n-heptane are added. While keeping the autoclave in agitation at 50° C., 79 g. of technical butadiene (90%) are added gradually in the course of about one hour. Four hours after the end of the addition of butadiene the reaction is stopped by introduction 50 cc. methanol, and the unreacted gases are removed from the still hot autoclave. After cooling, a gelatinous mass is obtained which is coagulated by means of methanol acidified with HCl, filtered and washed on the filter again with methanol. From the filtered liquid 3 g. of a viscous, liquid polymer are separated. 50 g. of a solid product, which appears completely amorphous under the X-rays and which has an iodine number of 350 (indicating 74.5% by weight of butadiene in the molecule) remain on the filter.

Example 2

3.8 g. triethyl aluminum dissolved in 100 cc. benzene, and 18 g. 1-pentene are introduced into a shaking autoclave of 0.45 liter capacity, from which the air has been carefully removed. The autoclave is heated and agitation is started; at about 50° C. a solution containing 1 cc. $TiCl_4$ in 30 cc. benzene is added and, soon after, a homogeneous mixture consisting of 17 g. of 1-pentene and 34 g. of 1,3-pentadiene is added. The reaction is continued for 6–7 hours at 50° C., then the polymerization agent is decomposed with methanol and the autoclave is cooled. The reaction product is treated as described in Example 1. 10 g. of a viscous liquid polymer and 23 g. of a solid product are obtained. The fraction soluble in acetone (41% of the total) of this latter has an iodine number of 331 (indicating 88% of pentadiene in the molecule), while the fraction soluble in ether (remaining 59%) has an iodine number of 233 (indicating 62% of pentadiene in the molecule).

Operating under the above indicated conditions but using instead of the pentadiene-pentene mixture only 1,3-pentadiene, liquid polymers 95% of which are soluble in acetone are obtained.

Example 3

3.25 g. triethyl aluminum dissolved in 100 cc. n-heptane, and 35 g. pentene-1 are introduced into a shaking autoclave of 0.45 liter capacity from which the air has been carefully removed. The temperature of the autoclave is brought to 40–50° C., then while keeping the autoclave in agitation, 1.5 cc. of $TiCl_4$ dissolved in 30 cc. of n-heptane are introduced and soon after 55 g. of technical butadiene are added.

The reaction is continued for 5 hours while maintaining the temperature at 40–50° C. The catalyst is decomposed and the reaction product is treated as described in the preceding examples. 2 g. of oily products and 30 g. of a solid polymer are obtained. The latter is fractionated by successive extractions with acetone, ether and heptane.

The fraction extracted with acetone (27% of the total) has an iodine number of 290 (indicating 61% of butadiene in the product); the fraction extracted with ether (48% of the total) has an iodine number of 193 (indicating 41% of butadiene in the product); and the fraction extracted with heptane (remaining 24%) has an iodine number of 241 (indicating 51% of butadiene in the product).

Example 4

20 g. triethyl aluminum dissolved in 300 cc. heptane, and 278 g. of a butene-1, butene-2 mixture containing about 55% butene-1, are introduced into a shaking autoclave of 2 liter capacity which has been previously evacuated. The autoclave is put in agitation and heated. As soon as the temperature has reached 40–50° C., 3.5 g. $TiCl_4$ dissolved in 50 cc. of heptane are added and soon after 20 g. technical butadiene. The temperature is maintained at 50° C. for 6 hours, then 50 cc. of methanol are introduced into the autoclave in order to decompose the metallo-organic compounds present. The unreacted gases are recovered from the still hot autoclave.

The reaction product is treated as described previously. 3 g. of a viscous liquid polymer and 39 g. of a solid polymerizate are obtained.

By fractional extraction with acetone, ether and heptane the following fractions were isolated:

Acetone extract—50%—iodine number 218 (indicating 46% butadiene in the polymerizate).

Ether extract—24%—iodine number 53 (indicating 11% butadiene in the polymerizate).

Heptane extract—20%—iodine number 46 (indicating 9.8% butadiene in the polymerizate).

Example 5

6 g. trihexyl aluminum, 13 g. pentene-1 and 2.4 g. hexadiene-(1,5) are introduced in an inert gas atmosphere into a glass flask of 0.1 liter capacity provided with a stirrer having a tight valve, a refluxing condenser and a separatory funnel. While keeping the liquid in agitation, 1.55 g. $TiCl_4$ dissolved in a mixture consisting of 1.2 g. of hexadiene-(1,5) and 6.5 g. pentene-1 are added from the separatory funnel in 1–2 minutes. During the addition of $TiCl_4$, and for 20–30 minutes after said addition, the flask is cooled so as to maintain a temperature of 30–40° C. About two hours from the beginning of the reaction, 20 cc. of methanol are introduced into the flask from the separatory funnel in order to decompose the metalloorganic compounds present. Then the unreacted pentene and hexadiene are distilled from the flask (preferably under reduced pressure). The dense polymer mass which remains in the flask is coagulated with methanol acidified with HCl, then washed several times with methanol by decantation, and finally dried at 40° C. (under reduced pressure). 9 g. of a solid polymerizate having an iodine number of 40.5 (indicating 13% hexadiene-1,5 in the polymerizate) are obtained. 1 g. of an oily low molecular weight polymer remains in suspension in the methanol used for the coagulation. The solid polymerizate obtained is completely amorphous.

*Example 6*

The same glass apparatus employed in Example 4 is used. 4 g. trihexyl aluminum, 7 g. pentene and 1.03 g. hexadiene-(1,5) are introduced into the flask. 1 g. TiCl$_4$ dissolved in a mixture of 7 g. pentene-1 and 1.03 g. of hexadiene-(1,5) are introduced from the separatory funnel. The temperature is maintained at 30–40° C. for about 2 hours, then the reaction is stopped by addition of methanol and the unreacted monomers are recovered by distillation. The polymer mass which remains in the flask is treated as described in the preceding example. 0.6 g. of oils and 7 g. of a solid polymerizate are obtained. The solid product obtained appears completely amorphous under the X-rays and has an iodine number of 21.5, indicating 7% of hexadiene-(1,5) therein.

Since various changes and variations may be made in details in practicing the invention without departing from the spirit and scope thereof, it is to be understood that it is not intended to limit the invention except as defined in the appended claims.

We claim:
1. A sulfur-vulcanizable, unsaturated rubber-like interpolymer of pentene-1 and hexadiene-1,5, the hexadiene-1,5 comprising about 13% by weight of the interpolymer, said interpolymer having an iodine number of about 40.

2. A sulfur-vulcanizable, unsaturated rubber-like interpolymer of pentene-1 and hexadiene-1,5, the hexadiene-1,5 comprising about 7% by weight of the interpolymer, said interpolymer having an iodine number of about 21.

3. The process for producing unsaturated high molecular weight copolymers which comprises copolymerizing a minor amount of piperylene with a major amount of an alpha-olefin selected from the group consisting of propylene and butene, in the presence of an inert diluent, with a catalyst prepared by mixing titanium tetrachloride and aluminum triethyl using an Al/Ti molar ratio of about 3.

References Cited by the Examiner

UNITED STATES PATENTS

| | | | |
|---|---|---|---|
| 2,477,018 | 7/1949 | Thomas et al. | 260—79.5 |
| 2,762,790 | 9/1956 | Greene | 260—92.3 |
| 2,862,917 | 12/1958 | Anderson et al. | 260—94.9 |
| 2,933,480 | 4/1960 | Gresham et al. | 260—79.5 |
| 3,112,301 | 11/1963 | Natta et al. | 260—85.3 |
| 3,114,743 | 12/1963 | Horne | 260—94.3 |
| 3,118,864 | 1/1964 | Robinson et al. | 260—94.3 |

FOREIGN PATENTS

| | | |
|---|---|---|
| 804,083 | 11/1958 | Great Britain. |
| 776,326 | 6/1957 | Great Britain. |

JOSEPH L. SCHOFER, *Primary Examiner.*

E. J. SMITH, *Assistant Examiner.*